United States Patent [19]

Butticci, deceased et al.

[11] 4,135,706
[45] Jan. 23, 1979

[54] WORKPIECE HOLDING ASSEMBLY

[76] Inventors: Donate Butticci, deceased, late of Phoenix, Ariz., by Donald E. Butticci, personal representative, 2319 W. Columbine, Phoenix, Ariz. 85020

[21] Appl. No.: 845,529

[22] Filed: Oct. 26, 1977

[51] Int. Cl.² .............................................. B23Q 1/04
[52] U.S. Cl. .............................. 269/82; 269/254 CS
[58] Field of Search ..................... 269/254 CS, 74, 81, 269/82, 73, 97–98, 55, 57

[56] References Cited

U.S. PATENT DOCUMENTS

| 552,400 | 12/1895 | Spires | 269/254 CS |
| 954,961 | 4/1910 | Highum et al. | 269/97 |
| 1,383,658 | 7/1921 | Olivier | 269/73 |
| 2,595,137 | 4/1952 | Hagopian | 269/82 |

FOREIGN PATENT DOCUMENTS

1064504 12/1953 France ...................................... 269/74

Primary Examiner—Robert C. Watson
Attorney, Agent, or Firm—Charles E. Cates

[57] ABSTRACT

A workpiece holder adapted for an operator having only one useful arm is disclosed wherein the retainer for the workpiece is mounted on a turntable that can be locked into position by using one hand. The retaining jaws can be simultaneously opened by the weight of the operator's arm on a flange connected to one jaw while the workpiece is inserted.

6 Claims, 3 Drawing Figures

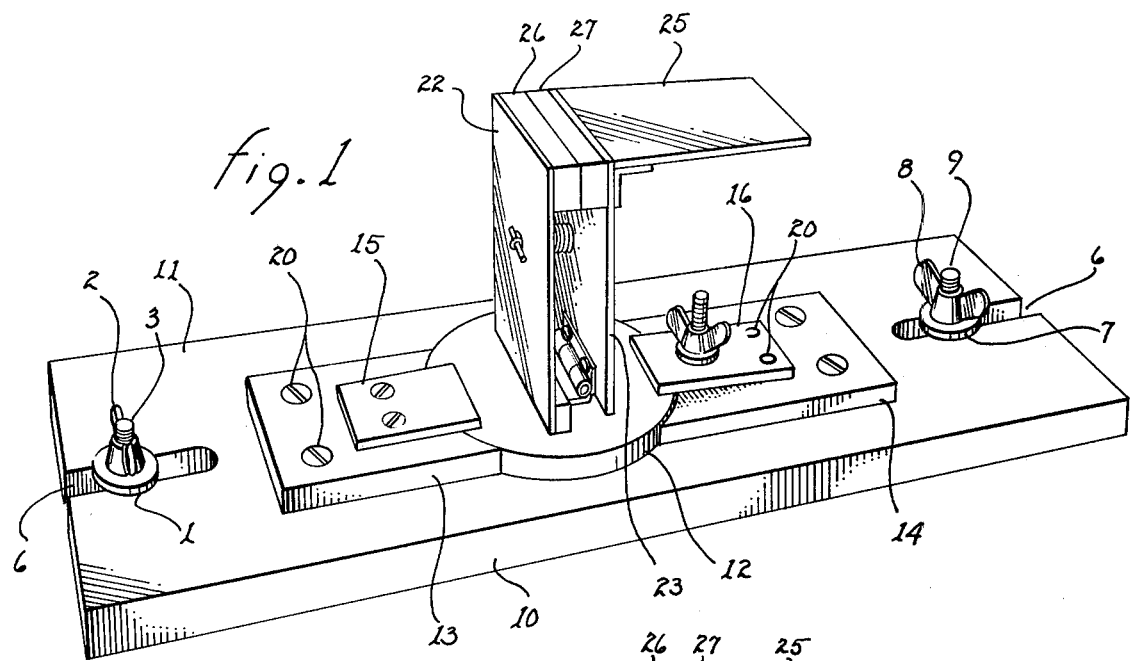
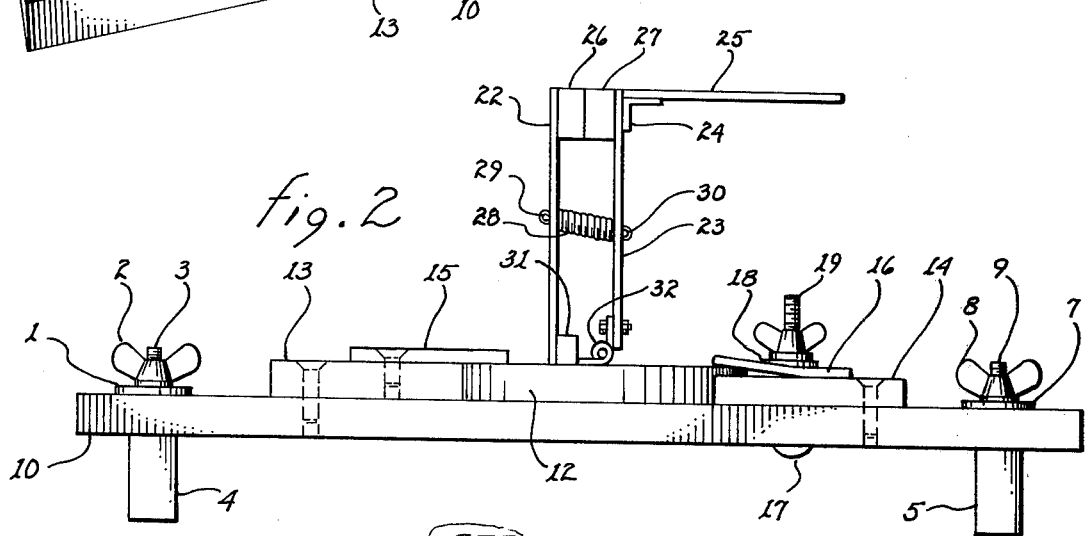
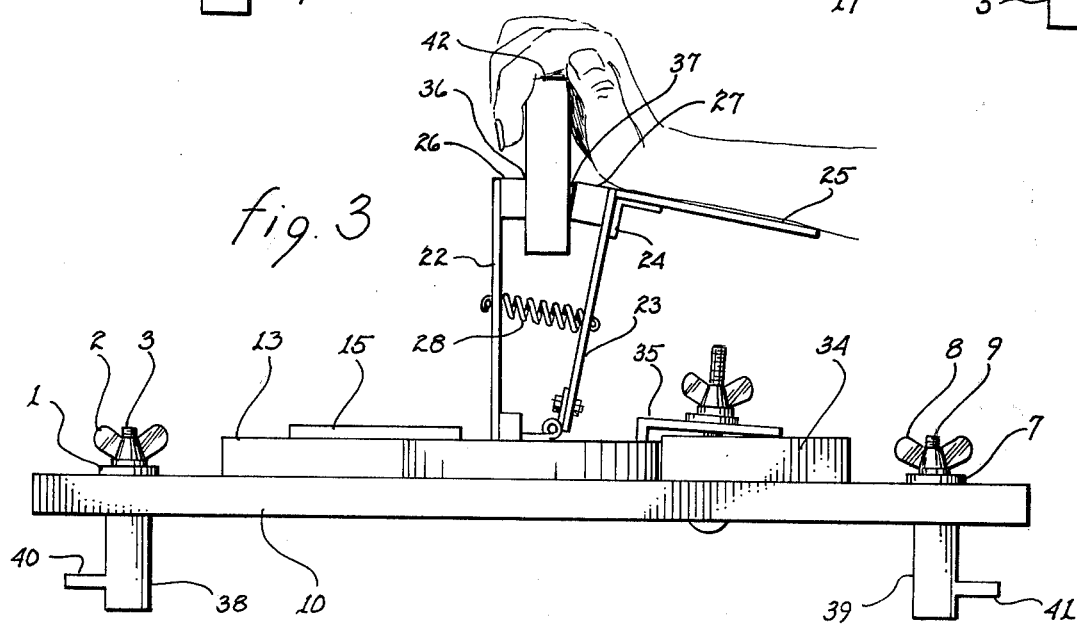

WORKPIECE HOLDING ASSEMBLY

BACKGROUND OF THE INVENTION

The invention relates to a holder for a workpiece wherein the workpiece can be inserted and positioned by an operator utilizing one arm.

A significant portion of the general population has a disability affecting the use of an arm or a hand. This disability causes many of the simple, routine tasks of daily living to be beyond the capability of those suffering such a disability. Among those tasks rendered extremely difficult are those requiring the maintaining of a workpiece in a convenient fixed position while one or more operations are performed on the workpiece. In the event that the disabled operator desires to change the position of the workpiece, present holding assemblies typically require a series of steps to be performed before a change can be made. In addition, presently available holding assemblies are not readily accommodated by a disabled operator's wheelchair or reclining apparatus.

Accordingly, the present invention is directed to the provision of a workpiece holding assembly which enables an operator to position a workpiece in a retaining apparatus at the desired attitude for the workpiece while using only one arm. Also, the holding assembly permits the operator to change the position of the workpiece without requiring it to be withdrawn from the retaining apparatus.

This holding assembly is capable of being utilized by an operator confined to a wheelchair or to a bed. The ability of the operator to perform a series of tasks on the workpiece without being positioned at a workbench is an important feature of the invention. Further, the adjustable features of the assembly including the location thereof on a wheelchair can be utilized by one having a single arm.

SUMMARY OF THE INVENTION

The workpiece holding assembly that is the subject of the invention includes a mounting base having upper and lower surfaces. A turntable is rotatably mounted on the upper surface along with engaging means mounted on the surface of the base. The engaging means locks the turntable in a fixed position when desired by the operator.

First and second workpiece retainers are mounted on the turntable in a substantially parallel manner. The first workpiece retainer is mounted in a fixed position and the second retainer is mounted by hinge means to permit movement thereof. Biasing means is coupled to the second retainer to urge the retainers in a closed position. The workpiece is inserted between the retainers which may be provided with contacting jaws at their upper end.

The second retainer is provided with a flange that is substantially perpendicular thereto. This flange receives the arm of the operator and enables the operator to overcome the biasing means and move the second retainer away from the first. Since the space between the retainers is increased by using the operator's arm, the operator's hand is able to insert the workpiece into the desired position. Removing the pressure of the arm from the flange causes the workpiece to be grasped by the retainers.

The operator then releases the engaging means and rotates the turntable so that the desired attitude and position of the workpiece are attained. Then, the operator activates the engaging means which prevents rotation of the turntable. The length of the base is generally made sufficient to extend across a chair so that the operator need not be transported to a workbench. Also, the base is provided with at least two holding legs which are adjustable to permit engagement with the arms of the wheelchair.

Further features and advantages of the invention will become more readily apparent from the following detailed description of a specific embodiment when viewed in conjunction with the accompanying drawings.

BRIEF DESCRIPTION OF THE DRAWINGS

FIG. 1 is a view in perspective of one embodiment of the invention.

FIG. 2 is a side view of the embodiment of FIG. 1.

FIG. 3 is a side view of a second embodiment with a workpiece inserted by the operator.

DETAILED DESCRIPTION OF THE PREFERRED EMBODIMENTS

Referring now to FIG. 1, the workpiece holding assembly is shown including mounting base 10 with a turntable 12 rotatably mounted on first surface 11 of the base. The turntable is held on surface 11 and guided in rotation by support plates 13 and 14 and engaging plates 15 and 16.

Turntable 12 is circular in configuration to provide a 360° rotation in the preferred embodiment and support plates 13 and 14 have an inner surface which conforms to the adjacent circumferential area of the turntable. As shown in FIG. 2, plate 13 has a thickness slightly larger than turntable 12 and engaging plate 15 extends over the turntable in an adjacently spaced position to prevent substantial axial movement or substantial frictional force on the turntable. However, support plate 14 is shown in FIGS. 1 and 2 having a thickness that is less than the thickness of the turntable. As a result, engaging plate 16 when in position on support plate 14 is not parallel with the surface 11 and is in contact with the upper surface of the turntable.

Both engaging plates 15 and 16 are affixed to their respective support blocks by screws 20. In addition, plate 16 is provided with bolt 17 passing therethrough with washer 18 and wing-nut 19 located on the upper surface thereof. Engaging plate 16 is urged against turntable 12 by screws 20 and the thickness of support plate 14 and, therefore, exerts a frictional force on the upper surface of the turntable which tends to prevent rotation of the turntable.

The frictional force exerted is increased by the tightening of wing-nut 19 which in turn causes the force normal to the surface of the turntable to increase. Consequently, the use of one hand is sufficient to lock the turntable into position. To permit repeated variations in the frictional force on the turntable when wing-nut 19 is adjusted, the plate 16 is formed of a resilient material, such as neoprene, which permits the plate to recover its initial slope.

First and second workpiece retainers 22 and 23 are mounted on the upper surface of turntable 11. Retainer 22 is fixedly mounted by the use of block 31. Retainer 23 is movably mounted by the use of hinge 32. As noted in FIG. 2, the retainer 23 is capable of movement about the axis of hinge 32. A bias spring 28 is shown coupled between the retainers 22 and 23 and acts to urge the retainers toward each other. The ends of spring 28 are taken through a hole in the corresponding retainer and secured by a wedge-shaped member 29 and 30. The use of the wedge-shape permits an operator to remove and replace a spring utilizing only one hand. Thus, the tension can be changed by the handicapped operator.

First and second contacting jaws 26 and 27 are mounted on the adjacent inner surfaces of retainers 22 and 23 respectively. These jaws are in contact with the workpiece when it is positioned on the assembly. An outwardly-extending flange 25 is secured at the top of movable retainer 23 by mounting bracket 24. In operation the flange receives the arm of the operator which overcomes the biasing force of spring 28 and results in retainer 23 pivoting about hinge 32. The jaws 26 and 27 are separated and the operator can insert the workpiece therebetween while at the same time, and with the same arm, control the separation of the jaws and the attitude of the workpiece therebetween. By removing the arm from the flange, the operator can then adjust the turntable by backing-off wing-nut 19, rotating the table so that the workpiece is appropriately positioned and then tighten the wing-nut. At this point in time, the operator can begin his tasks on the workpiece.

The base 10 of the holding assembly is made sufficient in length to rest on the arms of a wheelchair and preferably longer to insure that it can rest on the arms of a variety of styles of chairs. In the embodiment of FIGS. 1 and 3, a slot 6 is formed at a central location on the opposing ends of base 10. Located at each slot 6 is a combination of holding leg 4, 5 extending downwardly of the base, a threaded member 3, 9 extending upwardly from the holding leg through the slot, a threaded wing-nut 2, 8 and a washer, 1, 7. The holding legs are utilized to engage the sides of an arm of a chair and each may be moved in its corresponding slot by an operator loosening the wing-nut, moving the leg in to engagement with the chair and tightening the wing-nut. Also, the operator utilizing one arm can readily remove the holding legs 4 and 5 to permit the base to be placed on a flat surface. In one embodiment, four slots and four holding legs were utilized so that in addition to the foregoing uses, the assembly could be employed by an operator confined to bed. In this case, the holding legs support the assembly on either side of the operator's legs.

The embodiment of FIG. 3 shows the arm of the operator having inserted workpiece 42 between the jaws 26 and 27. In this embodiment, the jaws 26 and 27 are provided with serrated gripping surfaces 36 and 37 respectively. As shown, surface 37 has its lower edge deformed by the pressure applied by retainer 23.

In this embodiment, the engaging plate 35 is formed to have a downwardly extending flange portion that engages the upper surface of the turntable 10. The support 34 is shown having a thickness greater than that of the turntable. The variation of frictional force is attained by turning the corresponding wing-nut. Also, holding legs 38 and 39 are each provided with a lateral extension 40 and 41 respectively. These extensions are utilized to provide additional stability for the chair-mounted user by extending laterally under the arms of the wheelchair. In the event that the chair has solid arms, the operator need only loosen the corresponding wingnut, rotate the leg so that the extension is no longer outward and retighten the wing-nut.

The foregoing description has been directed to a workpiece holding assembly especially adapted for complete use by an operator handicapped in that only one arm is useful. While this description has referred to specific embodiments of the present invention, it is recognized that many variations and modifications may be made therein without departing from the spirit and scope of this invention.

What is claimed is:

1. A workpiece holding assembly adapted for an operator having one useful arm which comprises:
   a. a mounting base having first and second opposing surfaces;
   b. a turntable rotatably mounted on the first surface of said base;
   c. engaging means mounted on the second surface of said base for locking said turntable in a fixed position; said engaging means comprising a support plate mounted on the first surface of said base spaced adjacent to the turntable; an engaging plate mounted on said support plate for contacting the turntable to prevent rotation thereof; and means for activating said engaging plate and thereby position the workpiece on said assembly;
   d. first and second workpiece retainers mounted on the turntable, said first retainer being mounted in a fixed position, said second retainer being mounted in a movable position to permit insertion of a workpiece therebetween; said first and second workpiece retainers being substantially parallel and extending in a substantially perpendicular direction from the turntable, and further comprising hinge means for coupling the second retainer to the turntable.
   e. biasing means coupled to the second retainer for urging said first and second retainers in closed position; and
   f. a flange affixed to the second retainer and spaced from the turntable, said flange receiving the arm of the operator and thereby permitting insertion of the workpiece between the first and second retainers by said operator.

2. The assembly in accordance with claim 1 wherein said engaging plate contacts the upper surface of the turntable and wherein said means for activating said engaging plate varies the frictional force therebetween.

3. The assembly in accordance with claim 2 wherein said support has a thickness unequal to the thickness of the turntable and said engaging plate is a resilient plate contacting the surface of the turntable.

4. The assembly in accordance with claim 1 further comprising first and second holding legs depending from the second surface of the supporting base for engaging the arms of the operator's chair.

5. The assembly in accordance with claim 1 wherein said engaging means comprises:
   a. first and second support plates mounted on the first surface of the base and spaced adjacent the turntable at diametrically opposed positions, the inner surfaces of the support plates conforming to portions of the circumferential area of the turntable;
   b. first and second engaging plates mounted on the first and second support plates respectively and each extending over a portion of the surface of the turntable; and
   c. means for urging at least one of said engaging plates into frictional engagement with said turntable to prevent rotation thereof.

6. The assembly in accordance with claim 5 wherein said first and second engaging plates are of unequal thickness.